United States Patent [19]
Werner

[11] 3,955,845
[45] May 11, 1976

[54] CONVERTIBLE REMOVABLE STRUCTURE FOR THE BED OF A TRUCK

[76] Inventor: Willy T. Werner, 12541 Racine, Detroit, Mich. 48228

[22] Filed: Dec. 20, 1974

[21] Appl. No.: 534,768

[52] U.S. Cl. .................................. 296/10; 52/66; 52/79; 52/262; 52/271; 296/36; 296/137 B
[51] Int. Cl.² ............................................ B60P 3/42
[58] Field of Search ............... 296/10, 14, 36, 27, 296/137 B; 52/66, 79, 262, 271; 105/377, 378; 49/453, 463

[56] References Cited
UNITED STATES PATENTS

| | | | |
|---|---|---|---|
| 2,834,072 | 5/1958 | Miller | 52/66 X |
| 3,009,212 | 11/1961 | Makens | 52/66 |
| 3,026,139 | 3/1962 | Ackermann | 296/56 |
| 3,151,908 | 10/1964 | Horst | 296/137 B X |
| 3,201,907 | 8/1965 | Henderson | 52/79 X |
| 3,453,020 | 7/1969 | Santillo, Jr. | 296/100 |
| 3,493,131 | 2/1970 | Allen | 105/377 X |
| 3,758,998 | 9/1973 | Ollis | 52/79 |
| 3,837,702 | 9/1974 | Case | 296/36 |

Primary Examiner—Robert J. Spar
Assistant Examiner—Donald W. Underwood
Attorney, Agent, or Firm—Gifford, Chandler & Sheridan

[57] ABSTRACT

A removable structure for the bed of a truck, the components of the structure being removably joined together so that the entire structure can be easily disassembled for storage and shipment. The structure includes a framework which can be used for supporting implements such as ladders in conveying them to a work place. The invention also encompasses a roof, walls and a rear door mounted as separate components to the framework to form an enclosure such as a camper.

9 Claims, 10 Drawing Figures

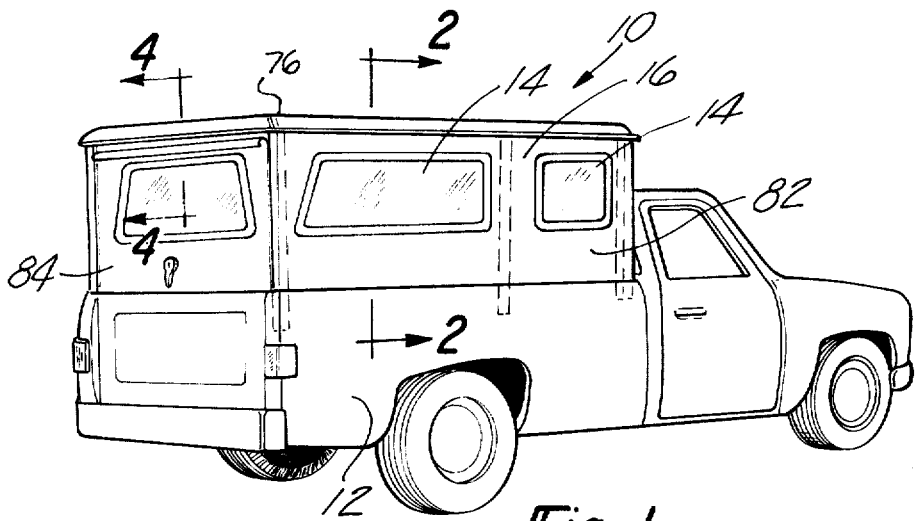
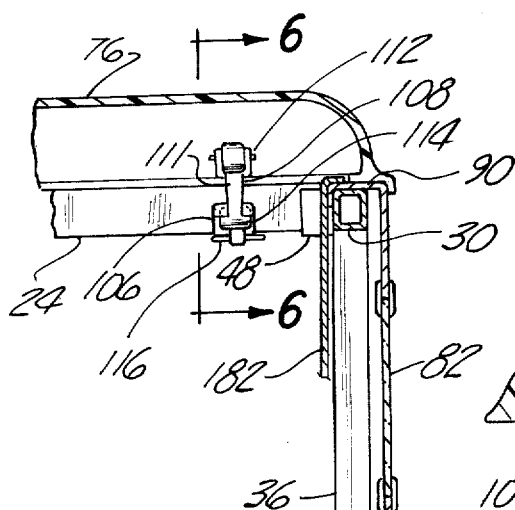
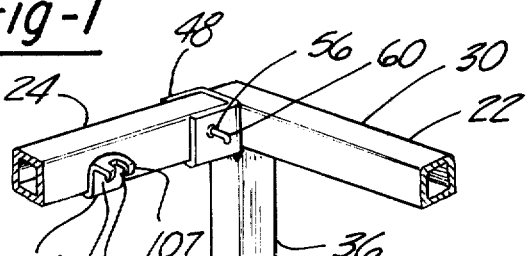
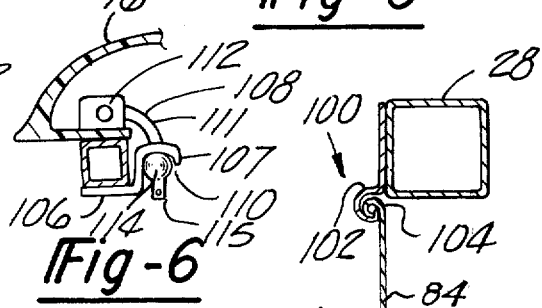
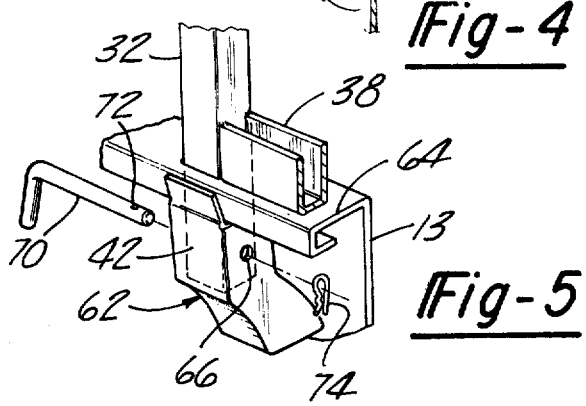

CONVERTIBLE REMOVABLE STRUCTURE FOR THE BED OF A TRUCK

BACKGROUND OF THE INVENTION

I. Field of the Invention

The present invention relates to land vehicles which are convertible into different forms or shapes to adapt them for use for different purposes and which are designed for easy dissassembly for storage and shipping. In particular, the invention pertains to a novel framework which is removably mounted on the bed of a truck for supporting implements above the floor of the bed, and which framework is readily converted into an enclosure, such as a camper.

II. Description of the Prior Art

There are a number of previously known vehicles which are convertible into different forms for different purposes. One such vehicle uses a superstructure for this purpose formed of tubular bars fastened together by sockets, the tubular bars being retained in the sockets by set screws. The superstructure also includes a roof and side walls. Vertically disposed straps are screwed to the inner surfaces of the walls and have a hooked end to engage the tubular bar framework to pivotally hang the wall panels in position. The bottom portion of the wall panels are secured in place by wing nuts which engage bolts welded to the truck bed.

Another known structure includes a framework which is fastened together by hinges, the framework being covered with a roof and wall panels, such that the entire structure is collapsible on the bed of the truck.

Yet another known structure comprises a framework of metal stringers secured together by nuts and bolts and incorporating gusset plates for reinforcement. The framework is used as an open truck top carrier for transporting implements above the truck bed floor.

No prior art device known to me provides the combination of attributes of the present invention, that is, a simple, easily disassembled framework having roof, wall panels and a door mountable on the framework without the need of tools or threaded fasteners.

BRIEF SUMMARY OF THE INVENTION

The present invention provides a structure removably mounted in the bed of a truck, the structure being formed of two side frame structures disposed along opposite longitudinal sides of the truck bed, a front top rail and a front intermediate rail each removably connected at its ends to the side frame structures at the front lateral side of the truck bed, and a back top rail removably connected at its ends to the side frame structures at the rear lateral side of the truck bed.

The invention also embraces the provision of wall panels mounted on the structure and secured thereto by flanges, a roof panel supported on the structure and secured in place by resilient clamps and a rear door hingeably mounted to the back top rail.

BRIEF DESCRIPTION OF THE DRAWINGS

A preferred embodiment of the invention is illustrated in the accompanying drawings, where like numerals refer to like parts throughout the several views and in which:

FIG. 1 is a rear three-quarter view of a pickup truck having an enclosed structure of the present invention mounted in the bed;

FIG. 2 is a sectional view taken along line 2—2 of FIG. 1;

FIG. 3 is a fragmentary view of a top side rail and top front rail of a frame structure of the present invention;

FIG. 4 is a sectional view taken along line 4—4 of FIG. 1;

FIG. 5 is a fragmentary view of the truck bed and side framework structure of the present invention;

FIG. 6 is a sectional view taken along line 6—6 of FIG. 2;

DETAILED DESCRIPTION OF A PREFERRED EMBODIMENT

With reference to FIG. 1, an enclosed structure, generally denoted as 10, is mounted in the bed 12 of a pick-up truck. The enclosed structure 10 is illustrated as converting the truck to a camper and has windows 14. A framework structure, generally denoted as 16, is partially illustrated in FIG. 1 by broken lines. This framework structure 16 is removably mounted in the bed 12 of the truck and supports the components of the enclosed structure 10.

Figure 10:
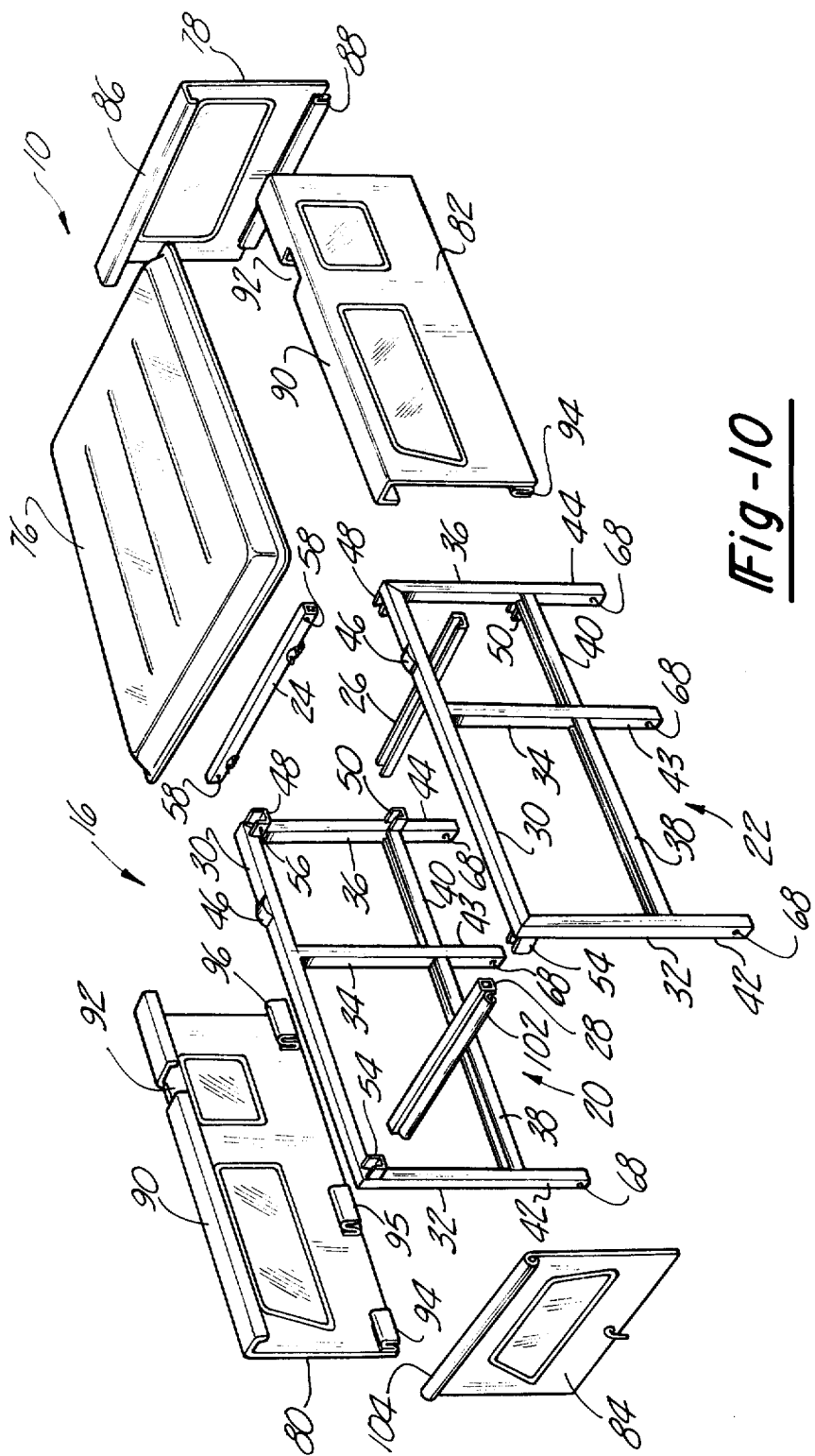
FIG. 10 is an exploded perspective view of the structure of FIG. 1.

As can best be seen in FIG. 10, the frame structure 16 consists of a first side frame, generally denoted as 20, located along one longitudinal side of the bed 12, a second side frame, generally denoted as 22, located along the other longitudinal side of the bed 12, a top front rail 24, located along the front lateral side of the bed 12, an intermediate front rail 26, also located along the front lateral side of the bed 12, and a back top rail 28, located along the back lateral side of the bed 12.

The components of the first and second side frames 20 and 22 are identical and are referred to by the same numerals. Each side frame 20 and 22 includes: a side top rail 30; vertical support beams 32, 34 and 36, connected at the ends of the top side rail 30 and at a predetermined location between the ends of the top side rail; and intermediate side rails 38 and 40, disposed in spaced parallel relationship to the top side rail 30 and attached at their ends to the vertical support beams 32, 34 and 36. Further, the intermediate side rails 38 and 40 are located between the ends of the vertical support beams 32, 34 and 36 so that a predetermined length 42, 43 and 44, of the support beams 32, 34 and 36, respectively, extend beyond them in a downward direction toward the truck bed 12. In addition, a projection 46 is attached to the top surface of the top rail 30, the purpose for which will be described hereinafter.

The top front rail 24 and the intermediate front rail 26 are removably mounted to the first and second side frames 20, 22. The means by which the top front rail is mounted to the side frames 20 and 22 are generally U-shaped brackets 48 which are attached, as by welding, to the upper front corner of each of the first and second side frames 20 and 22 such that the top front rail 24 will be in the same horizontal plane as the top side rails 30 when it is mounted in the brackets. Similar U-shaped brackets 50 are used to removably mount the intermediate front rail 26 to the side frames 20 and 22.

The U-shaped brackets 50 are attached to the vertical support beams 36 of the first and second side frames 20 and 22 at a location along the length of the vertical support beams 36 such that when the intermediate front rail 26 is mounted in the brackets 50 it will be in the same horizontal plane as the intermediate side rails 38 and 40 of the first and second side frames 20 and 22. Likewise, the back top rail 28 is mounted to the side frames 20 and 22 by generally U-shaped brackets 54 attached to the upper rear corners of the side frames such that the back top rail 28 will be in the same horizontal plane as the top side rails 20 and 22 when it is mounted in the brackets.

The top front rail 24, intermediate front rail 26 and back top rail 28 are securely held in their respective brackets by identical means. This securing means is illustrated in FIG. 3 and will be described in conjunction with the top front rail 24 and the second side frame 22, but the illustration and description apply equally to the intermediate rail 26 and the top back 28 also. A hole 56 is formed in both arms of the U-shaped bracket 48 and another hole 58 (refer to FIG. 10) extends through the top from rail 24 near its ends. The hole 56 and the hole 58 are axially aligned when the top front rail 24 is seated in the brackets 48. A pin 60 is slidably received through the holes 56 and 58 to prevent the top front rail 24 from inadvertently coming out of the brackets 48.

The intermediate front rail 26, and intermediate side rails 38 and 40 are preferably U-shaped in cross-section and are oriented such as to have their open sides facing upwardly, i.e., away from the truck bed 12. The purpose of this orientation will be subsequently described.

As hereinabove mentioned, the frame structure 16 is removably mounted in the bed 12 of the truck. As can be seen in FIG. 5, which shows a typical stake socket 62, this removable mounting is accomplished by inserting the lengths 42, 43 and 44 of the support beams 32, 34 and 36, respectively, in different stake sockets 62 which are provided in the bed 12 of most pick-up trucks. Further, FIG. 5 shows a portion of a vertical side wall 13 of the truck bed 12 having a flange 64 along its top edge.

The following description refers to mounting one of the vertical support beams in one of the stake sockets however, it is to be understood that the description applies to all the vertical support beams and stake sockets. The stake socket 62 has a hole 66 therethrough disposed perpendicularly to the longitudinal axis of the stake socket 62 and perpendicularly to the longitudinal axis of the support beam 32. The support beam 32 includes a hole 68 (FIGS. 2 and 10) formed near its end disposed perpendicularly to the longitudinal axis of the support beam 32 such that when the length 42 of the support beam 32 is inserted in the stake socket 62 the hole 66 in the socket is axially aligned with the hole 68 in the support beam 32. A pin 70 having one deformed end and a hole 72 through the other end is receivable through the hole 66 in the stake socket 62 and through the hole 68 in the support beam 32. When the pin 70 is inserted through the hole 66 in the stake socket 62 and through the hole 68 in the support beam 32 a key 74 can be inserted through the hole 72 in the pin 70. The deformed end of the pin 70 and the key 74 through the other end hold the pin 70 in place, thus, preventing removal of the support beam 32 and, therefore, securing the framework structure 16 in the bed 12.

Referring again to FIG. 10, the enclosed structure 10 includes a roof 76, a front wall 78, two side walls 80, 82, and a hinged rear door 84, all of which are removably supported on the framework structure 16.

The front wall 78 has a top edge 86 having a generally U-shaped transverse cross section and which concavely faces downward to engage the top front rail 24, and a bottom edge flange 88 having a generally U-shaped transverse cross-section concavely facing downwardly to engage one leg of the U-shaped intermediate front rail 26.

The two side walls 80 and 82 are substantially identical in construction, therefore, the various parts of each are referred to by the same reference numerals. While the following description refers only to the side wall 80 for clarity, it holds true with reference to the other side wall 82 as well.

Figure 8:
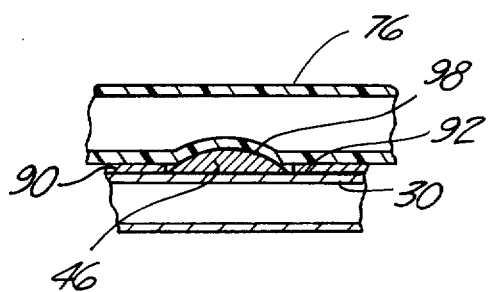
FIG. 8 is a sectional view taken along line 8—8 of FIG. 7.

With reference to FIGS. 2 and 10, the side wall 80 has a top edge 90 having a generally U-shaped transverse cross-section substantially identical to the U-shaped top edge 86 of the front wall 78. However, the side wall top edge 90 has a clearance opening 92 (FIG. 10) at a predetermined location and of a predetermined size to receive the projection 46 attached to the top surface of the side top rail 30 as best seen in FIG. 8. The U-shaped top edge 90 of the side wall 20 concavely faces downwardly and engages the side top rail 30. In addition, the side wall 80 also includes bottom edge flanges 94, 95 and 96, which have U-shaped transverse cross-sections and which concavely face downwardly. These side wall bottom flanges 94, 95 and 96 are identical to the bottom edge flange 88 of the front wall 78. FIG. 10 shows each side wall 80 and 82 having three bottom edge flanges 94, 95 and 96, however, it should be understood that the number used can be varied if desired. The bottom edge flanges 94, 95 and 96 of the side wall 80 engage one leg of the upwardly facing U-shaped side wall rails 38 and 40 as best seen in FIG. 2.

Figure 7:
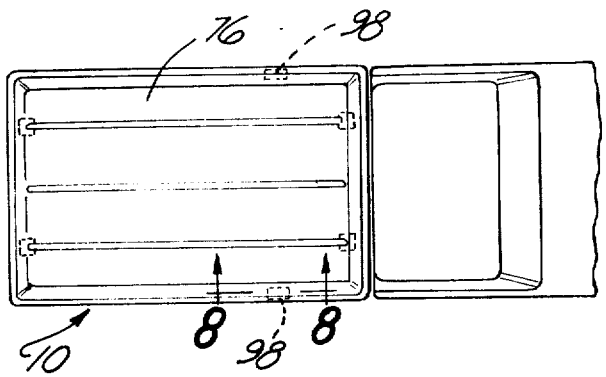
FIG. 7 is a top view of the truck bed with the enclosed structure of the present invention in place thereon.

Referring now to FIGS. 7 and 8, the roof 76 includes recesses 98 defined in its opposite longitudinal edges to receive therein the portions of the projections 46 which protrude through the clearance openings 92 of the side wall top edges 90 of the side walls 80 and 82. These recesses 98 cooperate with the projections 46 to properly locate the roof 76 on the framework structure 16. The relationship between the recesses 98 in the roof 76 and the projections 46 on the side top rails 30 is best seen in FIG. 8 which shows one of the projections 46 received in one of the recesses 98, but which applies equally to the other projection 46 and other recess 98 as well.

The rear door 84 is removably hinged to the back top rail 28 so that the user of the truck has an option of using the rear door or not as the particular use to which the enclosure will be put dictates. Referring to FIGS. 4 and 10, a hinge 100 consists of a first hinge element 102 and a second hinge element 104. The first hinge element 102 is disposed generally parallel to the longitudinal axis of, and connected to the back top rail 28. This connection may be, for example, by welding. The first hinge 102 is arcuately shaped in transverse cross-section. The second hinge element 104 is disposed generally parallel to, and is connected to the top edge of the rear door 84. The second hinge element 104 is shown as being integral with the top edge of the rear door 84 and is also arcuately shaped in transverse cross-section. The arcuately shaped second hinge element 104 is axially slidably received in the arcuately shaped first hinge element 102, and is pivotally supported therein for movement generally about the longitudinal axis of the first hinge element 102.

Referring now to FIGS. 2, 3 and 6, the roof 76 is secured in place on the frame structure 16 by retaining brackets 106 attached to the top front rail 24 and the back top rail 28. Clamps 108 are attached to the roof 76 to engage the retaining brackets 106.

As best seen in FIG. 6, each of the retaining brackets 106 has a free end 107 and a slot 109 (FIG. 3) disposed generally perpendicular to the top rail to which the bracket is attached, the slot being open to the free end 107. Further, the free end 107 is curved downwardly forming a hook 110. Each of the clamps 108 has an arm 111 pivotally connected at one end 112 to the roof 76 and has an extended portion 114 near its other end 115. The arm 111 is receivable in the slot 109 in the retaining bracket 106 through the opening at the free end 107 such that the extended portion 114 is received in the hook 110. The other end 115 of the clamp 108 includes a handle 116 (FIG. 2) to enable the user to more easily latch and unlatch the clamp 108 in the retaining bracket 106. Further, the clamp 108 is formed of a resilient material, such as rubber. In order to engage the clamp 108 in place in the retaining bracket 106, the arm 111 must be deformed to seat the extended portion 114 in the hook 110. In deforming the arm 111, the modulus of elasticity of the resilient material from which the clamp 108 is made provides the clamping force against the retaining bracket 106.

Figure 9:
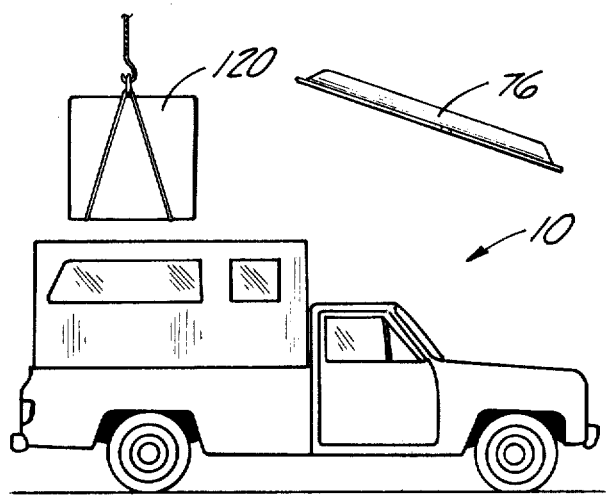
FIG. 9 is a side view of the pickup truck and enclosed structure of the present invention.

The clamps 108 and retaining brackets 106 allow the roof 76 to be easily removed without requiring tools. FIG. 9 shows one benefit derived by having the roof 76 easily removable, i.e., it allows the loading of an item 120 which is larger than the rear door opening to be loaded into the enclosed structure 10.

FIG. 2 shows a modification in which inside wall members 182 are mounted to the frame assembly in a manner substantially identical to the manner in which members 78 and 82 are mounted in place.

It is apparent that I have disclosed a readily mountable and demountable enclosure for the bed of a truck.

While I have described but one embodiment of the present invention it is apparent that many changes can be made therein without departing from the spirit of the invention or the scope of the appended claims.

I claim:

1. A convertible structure removably mounted to a bed of a truck, comprising:
    a frame structure;
    means for removably connecting said frame structure to the bed of the truck so that said frame structure extends generally upwardly therefrom;
    a plurality of closure panels;
    a roof panel;
    means for removably connecting each of said closure panels to said frame structure comprising a flange connected along a portion of the upper edge of each of said closure panels and adapted to overlay said frame structure between said roof panel and said frame structure, and tongue and groove means comprising a first member and a second member, said first member being connected along the lower depending edge of each of said closure panels and said second member being connected to said frame structure, wherein said first member cooperates with said second member to secure said closure panel to said frame structure, and
    means for removably connecting said roof panel to said frame structure so that said closure panel flange is entrapped intermediate said frame structure and said roof panel.

2. A convertible structure as defined in claim 1, wherein said frame structure comprises:
    a first frame member disposed along one longitudinal side of the truck bed;
    a second frame member disposed along the opposite longitudinal side of the truck bed;
    a plurality of first frame rails disposed transversely to said first and second frame members; and
    means for removably connecting said frame rails to said first and second frame members.

3. A convertible structure as defined in claim 2, wherein one of said closure panels comprises:
    a door panel; and
    hinge means removably and pivotally connecting said door panel to one of said transversely disposed frame rails.

4. A convertible structure as defined in claim 2, wherein said means for removably connecting said roof panel to said frame structure comprises:
    at least one clamping means connecting said roof panel to at least one of said frame rails.

5. A convertible structure as defined in claim 1, further comprising locating means for locating said roof panel at a predetermined position on said frame structure.

6. A convertible structure as defined in claim 5, wherein said locating means comprises:
    at least one projection extending generally upwardly from said frame structure; and
    a pocket formed in said roof panel to receive said projection.

7. A convertible structure as defined in claim 1, wherein:
    said second member is a tongue member of said tongue and groove means, and
    said first member is a grooved member of said tongue and groove means.

8. A convertible structure removably mounted to a bed of a truck, comprising:
    a frame structure;
    means for removably connecting said frame structure to the bed of the truck so that said frame structure extends generally upwardly therefrom;
    a plurality of closure panels; and
    means for removably connecting each of said closure panels to said frame structure comprising first means for connecting the upper edge of each of said closure panels to said frame structure and tongue and groove means comprising a first member and a second member, said first member being connected along the lower depending edge of each of said closure panels and said second member being connected to said frame structure, wherein said first member cooperates with said second member to secure said closure panel to said frame structure.

9. The invention as defined in claim 8 wherein said first member is a grooved member of said tongue and groove means and said second member is a tongue member of said tongue and groove means.

* * * * *